(12) United States Patent
Schreuder

(10) Patent No.: US 8,765,451 B2
(45) Date of Patent: Jul. 1, 2014

(54) METHOD OF TREATING AN OFF-GAS STREAM AND AN APPARATUS THEREFOR

(75) Inventor: Sandra Schreuder, Amsterdam (NL)

(73) Assignee: Shell Oil Company, Houston, TX (US)

( * ) Notice: Subject to any disclaimer, the term of this patent is extended or adjusted under 35 U.S.C. 154(b) by 112 days.

(21) Appl. No.: 13/263,146

(22) PCT Filed: Apr. 6, 2010

(86) PCT No.: PCT/EP2010/054507
§ 371 (c)(1),
(2), (4) Date: Nov. 9, 2011

(87) PCT Pub. No.: WO2010/115871
PCT Pub. Date: Oct. 14, 2010

(65) Prior Publication Data
US 2012/0058545 A1    Mar. 8, 2012

(30) Foreign Application Priority Data

Apr. 8, 2009  (EP) .................................... 09157609

(51) Int. Cl.
*C12M 1/04* (2006.01)
*C12S 5/00* (2006.01)

(52) U.S. Cl.
USPC ..... 435/266; 435/264; 435/294.1; 423/242.2; 423/243.11; 423/237; 423/576.4; 423/563

(58) Field of Classification Search
None
See application file for complete search history.

(56) References Cited

U.S. PATENT DOCUMENTS

| 3,822,337 | A | * | 7/1974 | Wunderlich et al. | .......... 423/224 |
| 4,088,743 | A | | 5/1978 | Hass et al. | .................... 423/224 |
| 5,543,122 | A | | 8/1996 | Hammond et al. | ........... 423/220 |
| 7,655,205 | B2 | * | 2/2010 | Van Grinsven et al. | ... 423/242.1 |
| 2005/0027155 | A1 | | 2/2005 | Pooler et al. | ................... 588/250 |
| 2005/0061149 | A1 | | 3/2005 | Nieuwenhuizen et al. | ..... 95/196 |
| 2011/0250113 | A1 | * | 10/2011 | Schreuder | ..................... 423/224 |

FOREIGN PATENT DOCUMENTS

| EP | 0451922 | | 10/1991 | ............. B01D 53/00 |
| EP | 0487102 | | 5/1992 | ............. B01D 53/34 |
| EP | 0487102 | A * | 5/1992 | |
| NL | 18801009 | | 11/1989 | ............. C01B 17/06 |

OTHER PUBLICATIONS

Perry's Chemical Engineers' Handbook $7^{th}$ Edition, Section 22; pp. 1-83; 1997.

* cited by examiner

Primary Examiner — Lisa J Hobbs

(57) ABSTRACT

The present invention provides a method of treating an off-gas stream (80) comprising $NH_3$ and $H_2S$ to provide a sulphate stream (910), the method comprising the steps of: (i) providing a first off-gas stream (80) comprising $NH_3$, $H_2S$, $CO_2$ and optionally one or more of HCN, COS and $CS_2$; (ii) passing the first off-gas stream (80) to an incinerator (300) to oxidize $NH_3$, $H_2S$, and optionally one or more of HCN, COS and $CS_2$ to provide a second off-gas stream (310) comprising $N_2$, $H_2O$, $SO_2$ and $CO_2$; (iii) scrubbing the second off-gas stream (310) with a first aqueous alkaline stream (380, 876*a*) in a caustic scrubber (350) to separate $SO_2$ and a part of the $CO_2$ from the second off-gas stream to provide a spent caustic stream (360) comprising carbonate and one or both of sulphite and bisulphite and a caustic scrubber off-gas stream (370) comprising $N_2$ and $CO_2$; and (iv) passing the spent caustic stream (360) to an aerator (900) comprising sulphur-oxidizing bacteria in the presence of oxygen to biologically oxidize sulphite and bisulphite to sulphate to provide a sulphate stream (910).

8 Claims, 2 Drawing Sheets

METHOD OF TREATING AN OFF-GAS STREAM AND AN APPARATUS THEREFOR

PRIORITY CLAIM

The present application claims priority from PCT/EP2010/054507, filed 6 Apr. 2010, which claims priority from European Application 09157609.0, filed 8 Apr. 2009.

The present invention provides a method of treating an off-gas stream comprising hydrogen sulphide and ammonia and optionally hydrogen cyanide, such as an off-gas stream produced in a gasification process, to provide a sulphate stream, and an apparatus therefor.

Gasification plants are well known in the art. In such plants, a hydrocarbon feed together with steam, nitrogen and oxygen can be passed to a gasifier. The hydrocarbon feed, such as coal, is partially oxidised to provide hot synthesis (also termed syngas) and ash, which can be in the form of slag.

Synthesis gas or syngas are used synonymously herein as general terms which are applied to mixtures of carbon monoxide, hydrogen and optional inert components that are derived from the gasification of coal, oil residues, waste or biomass. The main components of syngas are hydrogen and carbon monoxide. Further, often carbon dioxide and traces of methane are present. In addition, contaminants such as $NH_3$, $H_2S$ and sometimes HCN, COS and/or $CS_2$ may also be present. These contaminants can be removed in one or more treatment stages to provide a treated syngas. Syngas is a valuable feedstock for power production or for use in catalytic chemical reactions. Removal of contaminants from syngas is required to avoid deposition of contaminants onto gas turbine parts or to avoid catalyst poisoning.

Conventionally, hydrogen sulphide can be partially oxidised in an incinerator to provide a sulphur dioxide-comprising stream. The sulphur dioxide is then taken up in a caustic solution to provide a spent caustic stream comprising anionic oxides of sulphur, such as sulphite and bisulphite. The spent caustic solution can have a pH as high as 11.

The spent caustic solution is normally passed to a waste water treatment unit where it is neutralised. The neutralised solution is then passed to an oxidation unit where the aqueous anionic oxides of sulphur are oxidised to sulphate. The waste water treatment unit requires a large area in or adjacent to the off-gas treatment unit, with a substantial associated CAPEX.

The present invention provides a method of, and apparatus for treating an off-gas stream comprising ammonia and hydrogen sulphide to provide a sulphate stream.

In a first embodiment, the present invention provides a method of treating an off-gas stream (80) comprising $NH_3$ and $H_2S$ to provide a sulphate stream (910), the method comprising the steps of:
(i) providing a first off-gas stream (80) comprising $NH_3$, $H_2S$, $CO_2$ and optionally one or more of HCN, COS and $CS_2$;
(ii) passing the first off-gas stream (80) to an incinerator (300) to oxidise $NH_3$, $H_2S$, and optionally one or more of HCN, COS and $CS_2$ to provide a second off-gas stream (310) comprising $N_2$, $H_2O$, $SO_2$ and $CO_2$;
(iii) scrubbing the second off-gas stream (310) with a first aqueous alkaline stream (380, 876a) in a caustic scrubber (350) to separate $SO_2$ and a part of the $CO_2$ from the second off-gas stream to provide a spent caustic stream (360) comprising carbonate and one or both of sulphite and bisulphite and a caustic scrubber off-gas stream (370) comprising $N_2$ and $CO_2$; and
(iv) passing the spent caustic stream (360) to an aerator (900) comprising sulphur-oxidising bacteria in the presence of oxygen to biologically oxidise sulphite and bisulphite to sulphate to provide a sulphate stream (910).

In a further aspect, the present invention provides an apparatus for treating an off-gas stream comprising $H_2S$ to provide a sulphate stream, comprising at least:
an incinerator to oxidise $NH_3$, $H_2S$, and optionally one or more of HCN, COS and $CS_2$ in a first off-gas stream comprising $NH_3$, $H_2S$, $CO_2$ and optionally one or more of HCN, COS and $CS_2$ to provide a second off-gas stream comprising $N_2$, $H_2O$, $SO_2$ and $CO_2$, said incinerator having a first inlet for the first off-gas stream and a first outlet for the second off-gas stream;
a caustic scrubber to separate $SO_2$ and a part of the $CO_2$ from the second off-gas stream, said caustic scrubber having a first inlet for the second off-gas stream connected to the first outlet of the incinerator, a second inlet for a first aqueous alkaline stream and a first outlet for a spent caustic stream comprising carbonate and one or both of sulphite and bisulphite and a second outlet for a caustic scrubber off-gas stream comprising $N_2$ and $CO_2$;
an aerator comprising sulphur-oxidising bacteria in the presence of oxygen to oxidise sulphite and bisulphite to sulphate, said aerator having a first inlet for the spent caustic stream connected to the first outlet of the caustic scrubber, and a first outlet for the sulphate stream.

The method and apparatus of the invention use sulphur-oxidising bacteria to treat the spent caustic stream to provide a sulphate stream. Any water treatment unit can be reduced in size as it is no longer needed to to process the spent caustic stream.

Embodiments of the present invention will now be described by way of example only, and with reference to the accompanying non-limiting drawings in which.

For the purpose of this description, a single reference number will be assigned to a line as well as a stream carried in that line. The same reference numbers refer to similar components, streams or lines.

Figure 1:
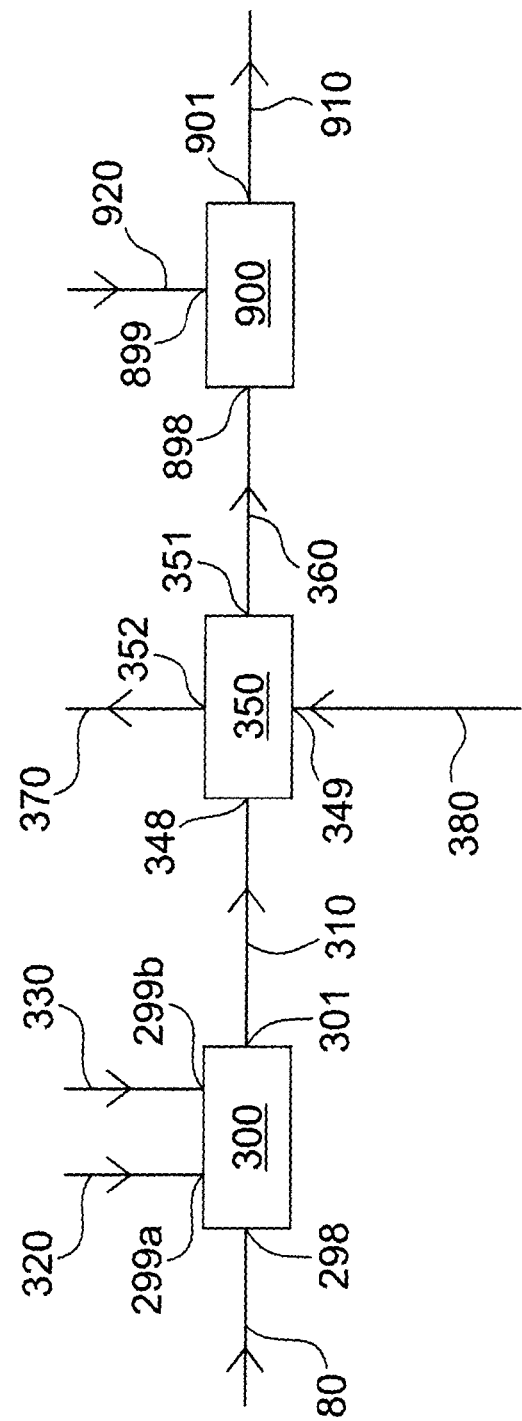
FIG. 1 shows a first embodiment of a typical process scheme according to the method of the invention.

FIG. 1 shows an apparatus for treating a first off gas stream 80, such as an off-gas stream in a gasification plant. First off-gas stream 80 comprises $NH_3$, $H_2S$, $CO_2$ and optionally one or more of HCN, COS and $CS_2$. In one embodiment discussed in detail in relation to FIG. 2 the first off-gas stream 80 can be supplied by a sour slurry stripper and/or a sour water stripper. The first off-gas stream 80 is preferably substantially free of particulate solids.

The first off-gas stream 80 is passed to a first inlet 298 of an incinerator 300. The incinerator 300 oxidises the combustible components of the first off-gas stream 80 to provide a second off-gas stream 310, which is an incinerator flue gas stream, at a first outlet 301. The hydrogen sulphide in the first off-gas stream 80 is partially oxidised to sulphur dioxide in the incinerator 300. Other combustible components such as $NH_3$ and if present HCN, $CS_2$ and COS are oxidised to their combustion products such as $H_2O$, $N_2$, $CO_2$ and, if one or both of $CS_2$ and COS are present, additional $SO_2$ is generated. The second off-gas stream 310 comprises $H_2O$, $CO_2$, $SO_2$ and $N_2$. An oxygen-comprising stream 320 such as air can also supplied to the incinerator 300 at a second inlet 299a to support combustion, and if necessary, a hydrocarbon-comprising fuel stream, 330, can be passed to a third inlet 299b.

The second off-gas stream 310 can be passed to the first inlet 348 of a caustic scrubber 350. The caustic scrubber 350 separates acid gasses such as $SO_2$ and $CO_2$ from the second off-gas stream. A first aqueous alkaline stream 380 is passed to the caustic scrubber 350 where the basic alkaline reacts with the acid gases to generate water and carbonate and one or both of sulphite and bisulphite. The formation of sulphite and/or bisulphite is dependent upon the pH of the first aqueous alkaline stream 380. Thus, by adjusting the pH of this stream the relative amounts of sulphite and bisulphite can be controlled.

Suitable aqueous alkaline streams 380 include aqueous hydroxide solutions, e.g. sodium hydroxide or potassium hydroxide solutions in water. The pH of the aqueous alkaline solvents is suitably between 7 and 12, more preferably between 8 and 11. The first aqueous alkaline stream 380 may be a fresh stream which has not previously been used, or a regenerated stream, such as a first part of a regenerated aqueous alkaline stream from a sulphur oxidation unit as discussed below in relation to FIG. 2.

The acid gasses are scrubbed from the second off-gas stream 310 to provide a spent caustic stream 360 comprising carbonate and one or both of sulphite and bisulphite in aqueous solution at a first outlet 351. The residual gasses comprising $N_2$ and a part of the $CO_2$ leave the caustic scrubber 350 via second outlet 352 as caustic scrubber off-gas stream 370.

The spent caustic stream 360 is passed to the first inlet 898 of an aerator 900 in which sulphite and bisulphite are biologically oxidised to sulphate by sulphur-oxidising bacteria in the presence of oxygen. The aerator may be supplied with oxygen in aerator air stream 920 at second inlet 899.

Reference herein to sulphide-oxidizing bacteria is to bacteria which can oxidize sulphite and/or bisulphite to sulphate. Suitable sulphide-oxidizing bacteria can be selected for instance from the known autotrophic aerobic cultures of the genera *Thiobacillus* and *Thiomicrospira*.

In a further embodiment not shown in FIG. 1, the aerator 900 can also be supplied with one or more further streams comprising one or more additives selected from the group comprising: sulphur oxidising bacteria, nutrients and buffering compound(s). The nutrients and buffering compound(s) can be the same as those discussed in relation to the bio-reactor of FIG. 2 below.

Alternatively, the first aqueous alkaline stream 380 may further comprise sulphur-oxidising bacteria and optionally nutrients and/or buffering agents. In this way, the sulphur-oxidising bacteria are already present in the first aqueous alkaline stream 380 and do not need to be supplied separately to aerator 900, for instance by inoculation or supply via a sulphur-oxidising bacteria comprising stream.

The sulphur oxidation reaction preferably takes place in a biological aerator, according to the following reactions:

$$HSO_3^- + OH^- \rightarrow SO_3^{2-} + H_2O \qquad (1)$$

$$2SO_3^{2-} + O_2 \rightarrow SO_4^{2-} \qquad (2)$$

Bisulphite, if present, is partially oxidised to sulphite according to reaction (1). Subsequently or simultaneously, sulphite present in the spent caustic stream 360, or generated in reaction (1) is oxidised to sulphate. The bio-oxidation of the sulphite compounds to sulphate results in aqueous sulphate, which can be removed from the aerator 900 at first outlet 901 as sulphate stream 910.

Figure 2:
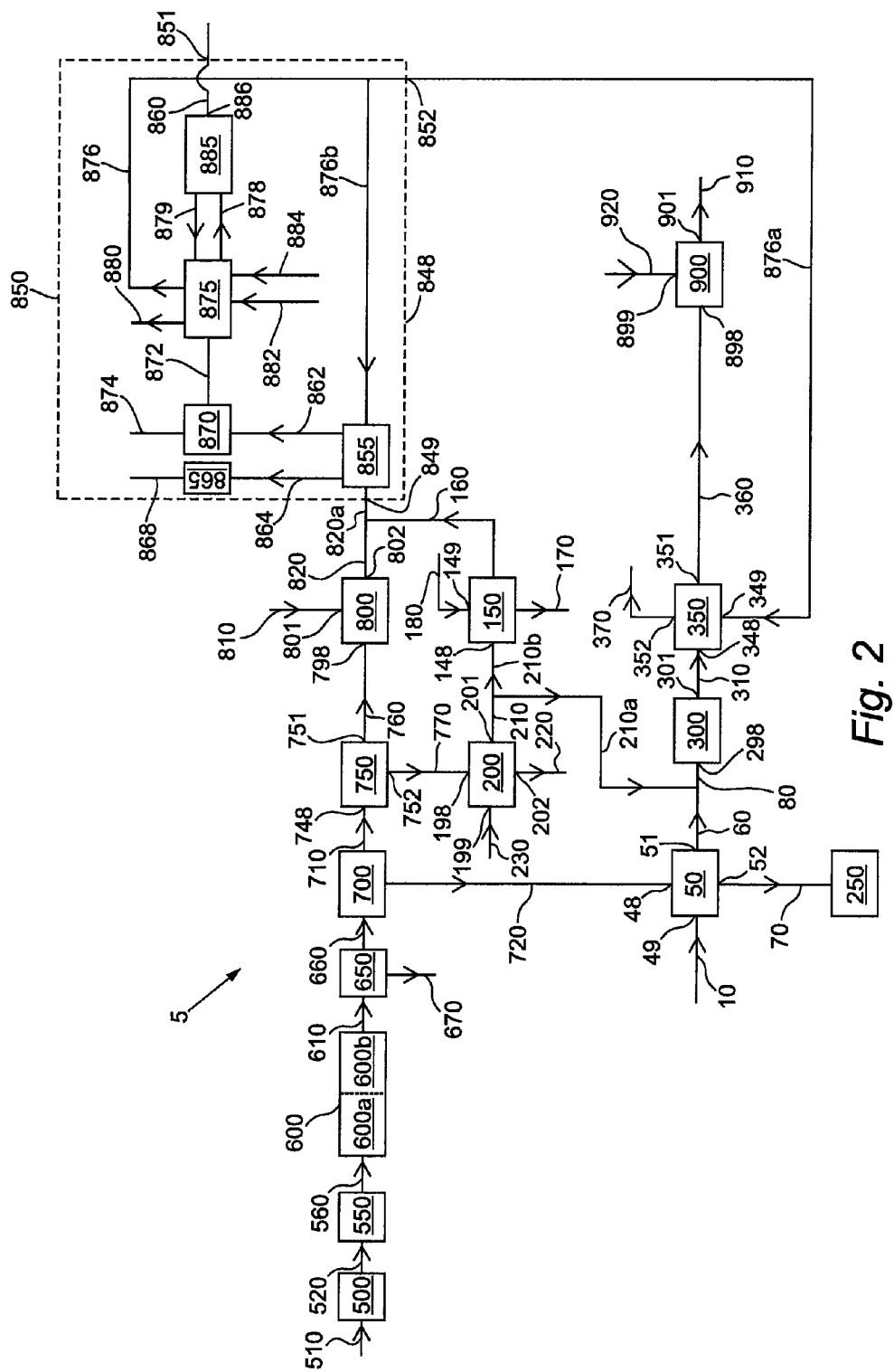
FIG. 2 shows a second embodiment of a typical process scheme according to the method of the invention.

FIG. 2 shows a generalised gasification scheme 5, such as a coal gasification scheme, utilising the method and apparatus disclosed herein. Those streams, units and zones described in respect of FIG. 1 will have identical reference numerals, names and functions in the scheme of FIG. 2.

A hydrocarbon feed 560, such as a prepared coal feed, can be provided by passing a raw hydrocarbon 510, such as a coal feedstock, to a milling and drying unit 500, where it is processed, optionally with flux, to provide a milled feed 520 such as a milled coal feed. The milled feed 520 is then passed to a feeding unit 550, which provides the hydrocarbon feed 560, such as milled and dried coal, to gasifier 600.

Gasifier 600 comprises a gasifying zone 600a and a cooling zone 600b. Inside the gasifying zone 600a the hydrocarbon feed, such as the milled and dried coal, is fed into burners, along with nitrogen, oxygen and steam. Ash, in the form of slag, gravitates down the gasifying zone 600a and into a slag quench tank, from which it can be transferred to a receiving bin for disposal. The product synthesis gas rises in the gasifying zone to an upper quench section, where it can be quenched by recycled syngas, for instance from a bleed stream from the raw syngas stream 710 discussed below after appropriate recompression, to provide a hot syngas stream. The hot syngas stream comprises CO, $H_2$, particulate solids, HCN, $NH_3$, $H_2S$, $CO_2$ and optionally one or both of COS and $CS_2$. The hot syngas stream can then be passed to a cooling zone 600b, such as a syngas cooler or waste heat boiler, where it is further cooled against a water stream, such as a boiling water stream, to provide a saturated steam stream and a cooled syngas stream 610.

The cooled syngas stream 610 can then be passed to a dry solids removal unit 650, such as a cyclone separator, where a large fraction of the particulate solids are separated from the gaseous components to provide fly ash 670 and a wet solids syngas stream 660 comprising CO, $H_2$, particulate solids, $H_2O$, HCN, $NH_3$, $H_2S$, $CO_2$ and optionally one or both of COS and $CS_2$.

The wet solids syngas stream 660 can be passed to a wet scrubbing column 700, where it can be scrubbed to provide a slurry bleed stream 720 comprising particulate solids, HCN, $NH_3$, $H_2S$, $CO_2$ and optionally one or both of COS and $CS_2$ and a raw syngas stream 710 comprising CO, $H_2$, HCN, $NH_3$, $H_2S$, $CO_2$ and optionally one or both of COS and $CS_2$.

The slurry bleed stream 720 can be passed to a sour slurry stripper 50 via first inlet 48. The sour slurry stripper 50 can also be supplied with a steam stream 10 at a second inlet 49. The steam can strip the gaseous components from the slurry bleed stream to provide the slurry off-gas stream 60 comprising HCN, $NH_3$, $H_2S$, $CO_2$ and optionally one or both of COS and $CS_2$ at a first outlet 51 of the sour slurry stripper 50 and a stripped slurry stream 70 comprising particulate solids at a second outlet 52 of the sour slurry stripper. The slurry off-gas stream 60 can be substantially free of particulate solids. The stripped slurry stream 70 can be passed to a clarifier 250 to dispose of the slurry.

The slurry off-gas stream 60 can then be passed to a first inlet 298 of an incinerator 300 as a first off-gas stream where it is processed in a similar manner to that discussed for FIG. 1 to provide, after scrubbing, a spent caustic stream 360 comprising carbonate and one or both of sulphite and bisulphite. The spent caustic stream 360 can then be passed to the aerator 900 to generate a sulphate stream 910.

The incinerator 300 provides a second off-gas stream 310 at first outlet 301. The second off-gas stream is passed to the caustic scrubber 350, where it is scrubbed with the first aqueous alkaline stream 876a to provide the spent caustic stream 360.

In the embodiment of FIG. 2, the first aqueous alkaline stream 876a is a first part of a regenerated aqueous alkaline stream 876 from the sulphur oxidation zone 850. The regenerated aqueous alkaline stream 876 can be drawn from the bio-reactor 875. Thus, the first aqueous alkaline stream may further comprise sulphur-oxidising bacteria, for instance from the bio-reactor 875, together with any nutrients and buffering compounds present. The operation of the bio-reactor 875 and sulphur oxidation zone 850 is discussed in greater detail below.

In a further embodiment, a bio-reactor bleed stream (not shown) can also be passed to aerator 900. The bio-reactor bleed stream can comprise the sulphur-oxidising bacteria and any nutrients and buffering compounds present in the bio-reactor 875. The bio-reactor bleed stream can be used to provide the sulphur-oxidising bacteria to the aerator 900, particularly if this is not present in the first aqueous alkaline stream, or supplement the amount of sulphur-oxidising bacteria in the aerator 900.

The raw syngas stream 710 from the wet scrubbing column 700 can then be passed to a high pressure hydrolysis unit 750, where HCN and if present COS and $CS_2$ can be hydrolysed to provide a hydrolysed syngas stream 760 comprising CO, $H_2$, $NH_3$, $H_2S$ and $CO_2$ at a first outlet 751 and a condensed water stream 770 comprising $H_2O$, $NH_3$, $CO_2$ and $H_2S$ at a second outlet 752. The condensed water stream 770 can be passed to the first inlet 198 of a sour water stripper 200, and is discussed in greater detail below.

The pressure in the high pressure hydrolysis unit 750 can be in the range of 1 to 100 bara, more preferably in the range of 2 to 80 bara.

In the high pressure hydrolysis unit 750, HCN and, if applicable, one or both of COS and $CS_2$ can be converted according to the following reactions:

Hydrolysis of HCN: $HCN + H_2O \rightarrow NH_3 - CO$     (A)

Hydrolysis of COS: $COS + H_2O \rightarrow H_2S + CO_2$     (B)

Hydrolysis of $CS_2$: $CS_2 + 2H_2O \rightarrow 2H_2S + CO_2$     (C)

The amount of water/steam in the high pressure hydrolysis unit 750 is preferably between 10 v/v % and 80 v/v %, more preferably between 20 v/v % and 70 v/v %, still more preferably between 30 v/v % and 50 v/v %, based on steam. At the preferred water/steam amounts, the conversion of HCN and optionally one or both of COS and $CS_2$ is improved. Typically, $H_2O$ can be present in the raw syngas stream 710 from the wet scrubbing operation in an amount sufficient to achieve conversion of HCN and, optionally one or both of COS and $CS_2$, if present.

Optionally, water or steam or a mixture thereof may be added to the raw syngas stream 710 prior to passing it to the high pressure hydrolysis unit 750, in order to achieve the desired water/steam amount. If one or both of COS and $CS_2$ are present, the total concentration of COS and $CS_2$ in the hydrolysed syngas stream 760 is suitably between 10 ppmv and 2 vol %, preferably between 20 ppmv and 1 vol %, based on the total gas stream.

The high pressure hydrolysis unit 750 can be a gas/solid contactor, preferably a fixed bed reactor. Catalysts for the hydrolysis of HCN, COS and $CS_2$ are known to those skilled in the art and include for example $TiO_2$-based catalysts or catalysts based on alumina and/or chromium-oxide. Preferred catalysts are $TiO_2$-based catalysts.

The hydrolysis results in a hydrolysed syngas stream 760 comprising $NH_3$, $H_2S$ and $CO_2$ which is HCN— and if applicable COS— and $CS_2$— lean, for instance having a concentration of HCN below 0.01 vol %, suitably between 0.1 ppmv and 0.01 vol %, more preferably between 0.1 ppmv and 1 ppmv, based on the total gas stream.

The concentration of COS, if present in the raw syngas stream 710, can be reduced in the hydrolysed syngas stream 760 to below 0.01 vol %, suitably between 1 ppmv and 0.01 vol %, more preferably between 1 ppmv and 10 ppmv, based on the total gas stream.

The concentration of $CS_2$, if present in the raw syngas stream 710, can be reduced in the hydrolysed syngas stream 760 to below 0.01 vol %, suitably between 1 ppmv and 0.01 vol %, more preferably between 2 ppmv and 50 ppmv, based on the total gas stream.

The hydrolysed syngas stream 760 can optionally be passed to the first inlet 798 of an acid gas removal unit 800, such as those known in the art. The acid gas removal unit 800 removes acid gases such as $H_2S$ and a portion of the $CO_2$ from the syngas to provide a treated syngas stream 810 at first outlet 801. The treated syngas stream 810 comprises $CO_2$, CO and $H_2$, and more preferably consists essentially of $CO_2$, CO and $H_2$. The treated syngas can then be passed for further processing, such as to a Fischer-Tropsch unit for conversion into longer chain liquid hydrocarbons.

In this way, the raw syngas stream 710 can be treated to provide a treated syngas stream 810 from which HCN, $NH_3$, $H_2S$, a portion of the $CO_2$ and, if present, COS and $CS_2$, have been removed.

The acid gas removal unit 800 also provides an acid gas stream 820 at a second outlet 802. The acid gas stream 820 comprises the acid gases $H_2S$ and $CO_2$ separated from the hydrolysed syngas stream 760.

The acid gas removal can be carried out by contacting the hydrolysed syngas stream 760 with an absorbing liquid to transfer $H_2S$ and a portion of the $CO_2$ from the hydrolysed syngas stream to the absorbing liquid. This is preferably carried out at relatively high pressure and ambient temperature.

The absorbing liquid comprising $H_2S$ and $CO_2$ can then be separated from the remaining gaseous components which leave the unit as the treated syngas stream 810. The separated absorbing liquid comprising $H_2S$ and $CO_2$ can then be regenerated by a stripping gas, normally at relatively low pressure and high temperature, to provide the acid gas stream 820 comprising $CO_2$ and $H_2S$.

The absorbing liquid may be any liquid capable of removing $H_2S$ and a portion of the $CO_2$ from the hydrolysed syngas stream 760. A preferred absorbing liquid comprises a chemical solvent as well as a physical solvent. Suitable chemical solvents are primary, secondary and/or tertiary amines. A preferred chemical solvent is a secondary or tertiary amine, more preferably an amine compound derived from ethanol amine, even more preferably DIPA, DEA, MEA, DEDA, MMEA (monomethyl ethanolamine), MDEA or DEMEA (diethyl monoethanolamine). DIPA and/or MDEA are particularly preferred. It is believed that these compounds react with acidic compounds such as $H_2S$ and/or $CO_2$, thereby removing $H_2S$ and/or $CO_2$ from the hydrolysed syngas stream 760.

Suitable physical solvents are sulfolane (cyclotetramethylenesulfone) and its derivatives, aliphatic acid amines, N-methylpyrrolidone, N-alkylated pyrrolidones and the corresponding piperidones, methanol, ethanol and dialkylethers of polyethylene glycols or mixtures thereof. The preferred physical solvent is sulfolane. It is believed that $H_2S$ and/or $CO_2$ will be taken up in the physical solvent and thereby removed from the hydrolysed syngas stream. Additionally, if mercaptans are present, they will be taken up in the physical solvent as well.

Preferably, the absorbing liquid comprises sulfolane, MDEA or DIPA, and water.

The concentration of $H_2S$ in the treated syngas stream 810 is lower than the concentration of $H_2S$ in the hydrolysed syngas stream 760. Typically, the concentration of $H_2S$ in the treated syngas stream is in the range of 0.0001% to 20%, more preferably from 0.0001% to 10% of the $H_2S$ concentration in the hydrolysed syngas stream 760. Suitably, the concentration of $H_2S$ in the treated syngas stream 810 is less than 10 ppmv, more preferably less than 5 ppmv.

The acid gas stream 820 can be passed to the first inlet 848 of the sulphur oxidation zone 850, which will now be discussed in greater detail. The sulphur oxidation zone 850 can separate the sulphur containing compounds such as hydrogen sulphide from the acid gas stream 820. The sulphur oxidation zone includes a bio-reactor 875 which is a bio-desulphurisation unit. Preferably the sulphur oxidation zone 850 is the same zone which is used to recover sulphate from the spent caustic stream 360.

The sulphur oxidation zone 850 first separates $H_2S$ from the acid gas stream 820 by contact with a second aqueous alkaline stream 876b formed from a second part, 876b, of the regenerated aqueous alkaline stream 876 in a $H_2S$-removal zone 855. The $H_2S$ is captured in the second aqueous alkaline stream 876b to provide a hydrogen sulphide-comprising aqueous stream 862.

The residual gasses comprising $CO_2$ can leave the $H_2S$-removal zone 855 as $H_2S$ removal zone vent gas stream 864. The $H_2S$ removal zone vent gas stream 864, is a "$H_2S$-lean" or "$H_2S$-depleted" gas stream, and is more preferably substantially free of $H_2S$. The $H_2S$ removal zone vent gas stream 864 can have a total concentration of sulphur compounds, especially $H_2S$, suitably between 0.01 and 30 ppmv, or below 25 ppmv, suitably between 0.01 and 20 ppmv, or below 15 ppmv, suitably between 0.01 and 10 ppmv, preferably between 0.05 and 3.5 ppmv, more preferably between 0.1 and 1 ppmv, based on the total gas stream. The $H_2S$ removal zone vent gas stream 864 can be passed to a knockout vessel 865 which provides knockout vessel off-gas stream 868.

The method is especially suitable if the load of sulphur compounds in the $H_2S$-removal zone 855 is below 60000 kg/day, suitably between 50 and 50000 kg/day, preferably between 75 and 20000 kg/day, more preferably between 100 and 10000 kg/day. At these sulphur loads, conventional processes such as the Claus process are difficult, if not impossible, to operate, whereas the method disclosed herein can be used advantageously.

Suitably, the total amount of $H_2S$ in the acid gas stream 820 is between 10 ppmv and 20 vol %, preferably between 20 ppmv and 10 vol %. An advantage of the method disclosed herein is that the $H_2S$ in the acid gas stream 820 can be removed even when the $H_2S$ amount is relatively low, typically between 10 ppmv and 20 vol %.

For other processes such as the Claus process it is necessary that an acid gas is produced that has a high $H_2S$ content to make it suitable as a Claus feed.

A suitable second aqueous alkaline stream 876b includes aqueous hydroxide solutions, e.g. sodium hydroxide or potassium hydroxide solutions in water. The pH of the aqueous alkaline solvents is suitably between 7 and 12, preferably between 8 and 11. The second aqueous alkaline stream 876b may further comprise one or more of the components found in the bio-reactor 875 from which it can be drawn, such as sulphur-oxidising bacteria, buffering compounds and nutrients.

The main reactions that can take place in the $H_2S$-removal zone 855 are:

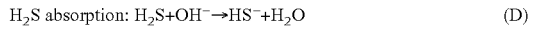

$H_2S$ absorption: $H_2S + OH^- \rightarrow HS^- + H_2O$      (D)

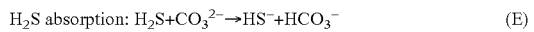

$H_2S$ absorption: $H_2S + CO_3^{2-} \rightarrow HS^- + HCO_3^-$      (E)

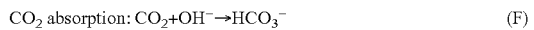

$CO_2$ absorption: $CO_2 + OH^- \rightarrow HCO_3^-$      (F)

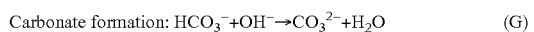

Carbonate formation: $HCO_3^- + OH^- \rightarrow CO_3^{2-} + H_2O$      (G)

Poly-hydrosulphide: $2HS^- + S_8 \rightarrow 2HS_5^-$      (H)

The term "hydrogen sulphide-comprising aqueous stream" 862 as used herein refers to an aqueous stream comprising one or more products of the main reactions (D) to (H) that can take place in the $H_2S$-removal zone 855, such as $HS^-$, disulphides, polysulphides, thiocarbonates and carbonates but can also include dissolved $H_2S$.

The preferred temperature in the $H_2S$ removal zone 855 is between 5 and 60° C., more preferably between 25 and 45° C. Preferably, the pressure in the $H_2S$ removal zone is between 1 and 75 bara, more preferably between 2 and 5 bara.

Typically, the $H_2S$ removal zone 855 is a gas/liquid contactor. Suitable gas/liquid contactors are described in Perry's Chemical Engineers' Handbook, 7th edition, section 14 (1997) and include for example a tray or packed column or a gas scrubber.

Optionally, the medium of the $H_2S$ removal zone 855 can be buffered. Preferred buffering compounds are carbonates, bicarbonates, phosphates and mixtures thereof, especially sodium carbonate and/or sodium bicarbonate. The concentration of the buffering compounds depends inter alia on the composition of the acid gas stream 820 and is generally adjusted in such a way that the pH of the reaction medium in the $H_2S$ removal zone 855 is between 6.0 and 10, more preferably between 6.5 and 9.0. The flow rate of the second aqueous alkaline stream 876b supplied to the $H_2S$ removal zone 855 can be adjusted to achieve the desired pH, and fresh aqueous alkaline added as necessary.

Due to their odorous nature, $H_2S$, mercaptans, sulphides, disulphides and aromatic mercaptans can be detected at parts per million concentrations. Thus, it is desirable for users of such gas and refinery streams to have total concentration of sulphur compounds, especially $H_2S$, lowered to a concentration of e.g. less than 30 or 20 ppmv, preferably less than 10 ppmv, based on the total fourth off-gas stream.

The hydrogen sulphide-comprising aqueous stream 862 can then be contacted with sulphide-oxidizing bacteria in the presence of oxygen in a bio-reactor 875, such as an oxidation reactor, to generate elemental sulphur and regenerate the aqueous alkaline. Nutrients can be fed to the bio-reactor 875 via nutrient stream 882. Off-gas can be vented from the bio-reactor via bio-reactor off-gas stream 880.

In a further optional step, the hydrogen sulphide-comprising aqueous stream 862 can be passed to a flash vessel 870 where excess gas is vented as a hydrogen sulphide-depleted off-gas stream 874 to provide a sulphide-comprising aqueous stream 872, which can then be passed to the bio-reactor 875.

The main reactions of sulphide anions that can take place in the bio-reactor 875, which is preferably an aerobic reactor, are the microbiological formation of sulphur and sulphate:

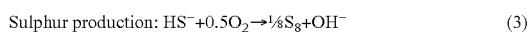

Sulphur production: $HS^- + 0.5O_2 \rightarrow \frac{1}{8}S_8 + OH^-$      (3)

Sulphate production: $HS^- + 2O_2 + OH^- \rightarrow SO_4^{2-} + H_2O$      (4)

The production of elemental sulphur produced in the bio-reactor 875 simultaneously regenerates aqueous alkaline as shown in reaction (3). The elemental sulphur together with the aqueous liquids will form a "sulphur slurry". As used herein, this term refers to a slurry comprising one or more products of the main reactions, including reactions (3) and (4), that can take place in the bio-reactor 875. The sulphur slurry can comprise aqueous sulphate and elemental sulphur.

Oxygen can be fed to the bio-reactor 875 via oxygen stream 884, which can be an air stream. The amount of oxygen fed into the bio-reactor 875 is adjusted such that the oxidation of absorbed sulphide results predominantly in sulphur, as suggested in NL 8801009, which discloses a process for the controlled oxidation of sulphur-containing waste water.

Reference herein to sulphide-oxidizing bacteria is to bacteria which can oxidize sulphide to elemental sulphur. If the first aqueous alkaline stream passed to the caustic scrubber 350 is a first part 876a of the regenerated aqueous alkaline stream 876 drawn from the bio-reactor 875, then the sulphur-oxidising bacteria therein should also be capable of oxidising sulphite and/or bisulphite to sulphate. Suitable sulphide-oxidizing bacteria can be selected for instance from the known autotrophic aerobic cultures of the genera *Thiobacillus* and *Thiomicrospira*.

Typical pressures in the bio-reactor 875 are between 1 and 2 bara. Suitably, the oxidation reactor has a volume of between 5 and 2500 m$^3$, preferably between 10 and 2000 m$^3$.

Preferably, the reaction medium in the bio-reactor 875 is buffered. The buffering compounds are chosen in such a way that the bacteria present in the oxidation reactor tolerate them. Preferred buffering compounds are carbonates, bicarbonates phosphates and mixtures thereof, especially sodium carbonate and/or sodium bicarbonate. The concentration of the buffering compounds depends inter alia on the composition of the gas flow and is generally adjusted in such a way that the pH of the reaction medium in the oxidation reactor is between 6 and 10, more preferably between 7 and 9.

The sulphur slurry and regenerated aqueous alkaline can be passed to a solid/liquid separator 885 as separator feed stream 878. Suitable solid/liquid separators are described in Perry's Chemical Engineers' Handbook, 7th edition, section 22 (1997). The sulphur-containing components are discharged as sulphate stream 860, which comprises sulphate and elemental sulphur as a sulphur cake. The remaining liquid exits the solid/liquid separator 885 and can be passed back to the bio-reactor 875 as aqueous alkaline recycle stream 879. In an alternative embodiment, the solid liquid separator 885 may be replaced with a thickener device, which produces a sulphate stream 860 which comprises sulphate and elemental sulphur as a sulphur slurry.

Typically between 5 and 95 w/w %, preferably between 10 and 90 w/w %, based on the total weight of the sulphur and regenerated aqueous alkaline stream 878, can be separated from the regenerated aqueous alkaline to provide the sulphate stream 860. The complete separation of sulphur from the regenerated aqueous alkaline is also envisaged.

Typically, the sulphur content of the sulphate stream 860 is between 5 w/w % and 50 w/w %, based on the sulphate stream 860. Typically, the water and sulphate can be removed to an extent that a sulphur cake with a dry solids content of between 55 and 70% is obtained.

Typically, the sulphur content of the sulphur cake is between 90 and 98 w/w %, based on the total weight of the sulphur cake. Optionally, the elemental sulphur can be re-slurried, filtered and dried to obtain a sulphur paste with a purity of at least 95 wt % sulphur, preferably at least 99 wt % sulphur. The sulphur paste thus-obtained can optionally be dried to produce a powder with a dry weight content of at least 85%, preferably at least 90%. This powder can suitably be applied as a fungicide or as a miticide.

The elemental sulphur produced in the method disclosed herein has a hydrophilic nature and does not cause the fouling problems that are typically caused by sulphur produced by non-biological liquid processes. Another advantage of the sulphur produced in the method is that it is very suitable for use as a fertilizer.

The regenerated aqueous alkaline produced in the bio-reactor 875 provides a regenerated aqueous alkaline stream 876. At least a part of the regenerated aqueous alkaline stream 876 can be recycled to the $H_2S$-removal zone 855 as the second aqueous alkaline stream 876b. Suitably, between 10 and 99%, preferably between 30 and 95%, more preferably between 40 and 90% of the total amount of regenerated aqueous alkaline is recycled to the $H_2S$-removal zone as the second aqueous alkaline stream 876b. By recycling the regenerated aqueous alkaline to the $H_2S$-removal zone 855 fresh aqueous alkaline is supplied to the $H_2S$-removal zone for the removal of $H_2S$. This enhances the removal of $H_2S$ to a concentration of 30 ppmv or less, suitably 20 ppmv or less, preferably 10 ppmv or less. The regenerated aqueous alkaline stream 876 may optionally comprise sulphur particles.

At least a part of the regenerated aqueous alkaline stream 876 can be passed to the caustic scrubber 350 as first aqueous alkaline stream 876a.

The condensed water stream 770 produced by the hydrolysis unit 750 can be passed to the first inlet 198 of a sour water stripper 200. A stripping agent such as steam can be passed to a second inlet 199 of the sour water stripper 200 as steam stream 230 and used to separate the gaseous components such as $NH_3$, $H_2S$ and $CO_2$ from the condensed water stream. A sour water stripper off-gas stream 210 comprising $NH_3$, $H_2S$ and $CO_2$ is produced at a first outlet 201 of the sour water stripper 50. A sour water stripper water stream 220 is produced at a second outlet 202 of the sour water stripper 200.

In a further embodiment, at least a part 210a of the sour water stripper off-gas stream 210 can be passed to the incinerator 300 as a first off-gas stream, to oxidise the combustible components such as $NH_3$ and $H_2S$ to their combustion products such as $N_2$, $H_2O$ and $SO_2$. This is particularly preferable if the sour water stripper off-gas stream 210 has a relatively small flow, such that it can be entirely passed to the incinerator 300 as sour water stripper off-gas incinerator feed stream 215. This can be passed to a dedicated inlet of the incinerator 300, or as shown in FIG. 2 combined with the slurry stripper off-gas stream 60 prior to being passed to the incinerator 300 as the first off-gas stream. This is advantageous because additional processing units such as an ammonia scrubber 150 are not required.

In the case where the incinerator 300 cannot easily handle a flow the size of the sour water stripper off-gas stream 210 in addition to the slurry stripper off-gas stream 60 from the sour slurry stripper 50, at least a part 210b of the sour water stripper off-gas stream 210 can be passed to the first inlet 148 of an ammonia scrubber 150.

Inside the ammonia scrubber 150, the part 210b of the sour water stripper off-gas stream 210 can be treated with an aqueous acidic stream 180, which enters the scrubber at a second inlet 149. The aqueous acidic stream 180 reacts with the basic ammonia to provide an ammonium-comprising aqueous stream 170 at a second outlet 152 of the scrubber and an ammonia scrubber off-gas stream 160 at a first outlet 151. In a preferred embodiment, the aqueous acidic stream 180 is an aqueous sulphuric acid stream and the ammonium-comprising aqueous stream 170 is an ammonium sulphate aqueous stream. The ammonia scrubber off-gas stream 160 comprises $H_2S$ and $CO_2$ and is depleted of, more preferably substantially free of HCN, COS and/or $CS_2$ and $NH_3$.

The ammonia scrubber off-gas stream 160 can then be passed to a sulphur oxidation zone 850. For example, the ammonia scrubber off-gas stream can be combined with the acid gas stream 820 to provide a combined acid gas stream 820a and passed to the first inlet 848 of the $H_2S$ removal zone 855, where it can be contacted with an aqueous alkaline stream 410 as discussed above. The $H_2S$ can be captured in the aqueous alkaline stream to provide the hydrogen sulphide-comprising aqueous stream 862. In this embodiment the $H_2S$ removal zone 855 captures the hydrogen sulphide from both the acid gas and the ammonia scrubber off-gas. In an alternative embodiment which is not shown in FIG. 2, the ammonia scrubber off-gas stream 160 can be provided to a separate inlet of the $H_2S$-removal zone 855.

The person skilled in the art will understand that the present invention can be carried out in many various ways without departing from the scope of the appended claims.

What is claimed is:

1. A method of treating an off-gas stream comprising $NH_3$ and $H_2S$ to provide a sulphate stream, the method comprising the steps of:
   providing a first off-gas stream comprising $NH_3$, $H_2S$, and $CO_2$;
   passing the first off-gas stream to an incinerator to oxidize $NH_3$ and $H_2S$ to provide a second off-gas stream comprising $N_2$, $H_2O$, $SO_2$, and $CO_2$;
   scrubbing the second off-gas stream with a first aqueous alkaline stream in a caustic scrubber to separate $SO_2$ and a part of the $CO_2$ from the second off-gas stream to provide a spent caustic stream comprising carbonate and one or both of sulphite and bisulphate and a caustic scrubber off-gas stream comprising $N_2$ and $CO_2$;
   passing the spent caustic stream to an aerator comprising sulphur-oxidising bacteria in the presence of oxygen to biologically oxidize sulphite and bisulphite to sulphate to provide a sulphate stream.

2. The method according to claim 1 wherein the first off-gas stream is an off-gas stream in a gasification apparatus.

3. The method according to claim 1 wherein at least a part of the first off-gas stream is provided by the further steps comprising:
   providing a slurry bleed stream comprising particulate solids, HCN, $NH_3$, $H_2S$, and $CO_2$ and
   passing the slurry bleed stream to a sour slurry stripper to separate particulate solids from the slurry bleed stream to provide a slurry stripper off-gas stream comprising HCN, $NH_3$, $H_2S$, and $CO_2$ as at least a part of the first off-gas stream and a stripped slurry stream comprising particulate solids.

4. The method according to claim 1 further comprising the steps of:
   providing a raw syngas stream comprising CO, $H_2$, HCN, $NH_3$, $H_2S$, and $CO_2$;
   passing the raw syngas stream to a hydrolysis unit to hydrolyse HCN to provide a hydrolysed syngas stream comprising CO, $H_2$, $NH_3$, $H_2S$, and $CO_2$ and a condensed water stream comprising $NH_3$, $CO_2$, and $H_2S$;
   passing the hydrolysed syngas stream to an acid gas removal unit to separate $H_2S$ and a portion of $CO_2$ from the hydrolysed syngas stream to provide a treated syngas stream comprising CO, $H_2$, and $CO_2$ and an acid off-gas stream comprising $H_2S$ and $CO_2$;
   passing the acid off-gas stream to a sulphur oxidation zone comprising sulphur-oxidising bacteria in the presence of oxygen to provide elemental sulphur by biological oxidation.

5. The method according to claim 4 wherein passing the acid off-gas stream to a sulphur oxidation zone comprising sulphur-oxidising bacteria in the presence of oxygen to provide elemental sulphur by biological oxidation comprises:
   contacting the acid off-gas stream with a second aqueous alkaline stream in an $H_2S$-removal zone of the sulphur oxidation zone to provide a first vent stream comprising $CO_2$ and a hydrogen sulphide-comprising aqueous stream; and
   passing the hydrogen sulphide-comprising aqueous stream to a bio-reactor comprising the sulphide-oxidising bacteria in the presence of oxygen to regenerate aqueous alkaline and provide elemental sulphur.

6. The method according to claim 5 further comprising the step of:
   recycling at least a part of the regenerated aqueous alkaline as regenerated aqueous alkaline stream to one or both of the caustic scrubber as the first aqueous alkaline stream and the $H_2S$-removal zone as the second aqueous alkaline stream.

7. The method according to claim 4 further comprising the steps of:
   providing a condensed water stream comprising $H_2O$, $NH_3$, $CO_2$, and $H_2S$;
   passing the condensed water stream to a sour water stripper to provide a sour water stripper off-gas stream comprising $NH_3$, $H_2S$, and $CO_2$ and a sour water stripper water stream; and
   passing at least a part of the sour water stripper off-gas stream to the incinerator as a or a part of the first off-gas stream.

8. The method according to claim 7 further comprising the step of:
   scrubbing at least a part of the sour water stripper off-gas stream with an aqueous acidic stream in an ammonia scrubber to provide an ammonia scrubber off-gas stream comprising $H_2S$ and $CO_2$ and an ammonium-rich aqueous stream; and
   passing the ammonia scrubber off-gas stream to the sulphur oxidation zone to provide elemental sulphur such that the sulphate stream further comprises elemental sulphur.

* * * * *